(12) United States Patent
Fink et al.

(10) Patent No.: US 7,872,568 B2
(45) Date of Patent: Jan. 18, 2011

(54) METHOD FOR THE TARGETED STIMULATION OF WHEEL ELECTRONICS SYSTEMS OF TIRE GROUPS

(75) Inventors: Alexander Fink, Dittelbrunn (DE); Frank Fischer, Regensburg (DE); Gregor Kuchler, Regensburg (DE)

(73) Assignee: Siemens VDO Automotive AG, Munich (DE)

( * ) Notice: Subject to any disclaimer, the term of this patent is extended or adjusted under 35 U.S.C. 154(b) by 476 days.

(21) Appl. No.: 11/960,002

(22) Filed: Dec. 19, 2007

(65) Prior Publication Data

US 2008/0154560 A1 Jun. 26, 2008

(30) Foreign Application Priority Data

Dec. 21, 2006 (DE) .................. 10 2006 060 755

(51) Int. Cl.
*B60C 23/00* (2006.01)
(52) U.S. Cl. .................. 340/426.33; 340/442; 340/447
(58) Field of Classification Search ............... 703/8; 701/1, 2; 340/445, 442, 447, 426.33; 152/415; 702/145; 73/146.2, 146.5
See application file for complete search history.

(56) References Cited

U.S. PATENT DOCUMENTS

| | | | |
|---|---|---|---|
| 5,531,109 A * | 7/1996 | Tsagas .................. 73/146.5 |
| 7,042,348 B2 * | 5/2006 | Schulze et al. ............... 340/447 |
| 7,274,977 B2 * | 9/2007 | Frashure ..................... 701/2 |
| 2002/0092347 A1 * | 7/2002 | Niekerk et al. ............. 73/146.2 |
| 2002/0113692 A1 * | 8/2002 | Normann et al. ............ 340/442 |
| 2004/0066288 A1 * | 4/2004 | Okumura .................... 340/445 |
| 2005/0007245 A1 * | 1/2005 | Smith et al. ................. 340/442 |
| 2005/0057348 A1 * | 3/2005 | Hammerschmidt ......... 340/445 |
| 2005/0199328 A1 * | 9/2005 | Schoenberger et al. ...... 152/415 |
| 2005/0234677 A1 * | 10/2005 | Fischer et al. ............... 702/145 |
| 2005/0273218 A1 * | 12/2005 | Breed et al. .................... 701/2 |
| 2006/0001535 A1 | 1/2006 | Hafele et al. |
| 2006/0006992 A1 * | 1/2006 | Daiss et al. ................. 340/442 |
| 2007/0055411 A1 * | 3/2007 | Nihei et al. .................... 701/1 |
| 2007/0279203 A1 * | 12/2007 | Thomas et al. .............. 340/447 |

* cited by examiner

*Primary Examiner*—Paul L Rodriguez
*Assistant Examiner*—Kandasamy Thangavelu
(74) *Attorney, Agent, or Firm*—Laurence A. Greenberg; Werner H. Stemer; Ralph E. Locher

(57) ABSTRACT

A method for stimulating wheel electronics systems of single tires of at least one tire group in a motor vehicle. The wheel electronics systems are stimulated with a low frequency trigger signal, as follows: a trigger signal is emitted from an LF trigger to the wheel electronics systems of the relevant tire group at a variably adjustable first transmission field strength. Radio frequency signals are transmitted from those wheel-side wheel electronics systems, at which a sufficiently high transmission field strength of the trigger signal has arrived containing an item of trigger information, to a vehicle-side receiving unit. A determination is made of the number of RF signals received by the vehicle-side receiving unit, each containing one item of trigger information.

10 Claims, 4 Drawing Sheets

METHOD FOR THE TARGETED STIMULATION OF WHEEL ELECTRONICS SYSTEMS OF TIRE GROUPS

CROSS-REFERENCE TO RELATED APPLICATION

This application claims the priority, under 35 U.S.C. §119, of German patent application DE 10 2006 060 755, filed Dec. 21, 2006; the prior application is herewith incorporated by reference in its entirety.

BACKGROUND OF THE INVENTION

Field of the Invention

The invention relates to a method for the targeted stimulation of wheel electronics systems of tire groups.

The problem here is how to stimulate wheel electronics systems in a targeted manner using an LF trigger for emission.

It has become known heretofore to cause the initialization and localization of wheels of motor vehicles using a low frequency (LF) trigger. In such cases an LF trigger unit sends a signal to a wheel electronics system, which in turn sends a signal to a vehicle-side control unit by way of a radio frequency (RF) transmission. The RF signal also contains information that makes it possible to infer therefrom the position of the respective wheel electronics system and/or wheel.

Localization methods are also known, for example for heavy trucks, which also require stimulation of more than one wheel electronics system with only one LF trigger. The stimulation of two wheel electronics systems of two single tires of a dual tire with only one LF trigger is of particular interest. The main problem in this case is to be certain of stimulating both wheel electronics systems of the single tires of the respective dual tires of the axle in question, while at the same time avoiding stimulation of adjacent wheel electronics systems or even the other two wheel electronics systems of the dual tire on the opposite end of the same axle.

The problem has previously been resolved by using for each wheel electronics system one LF trigger with comparatively low field strength. The main disadvantage of that method is a high technical outlay, coupled with the risk that it is not guaranteed that the target wheel electronics systems will respond. In contrast thereto, with field strengths that are too high crosstalk to adjacent wheel electronics systems could not be ruled out.

SUMMARY OF THE INVENTION

It is accordingly an object of the invention to provide a method for the targeted stimulation of wheel electronics systems of tire pressure monitoring systems for tire groups which overcomes the above-mentioned disadvantages of the prior art devices and methods of this general type and which enables a precise response from the target wheel electronics systems.

With the foregoing and other objects in view there is provided, in accordance with the invention, a method for stimulating wheel electronics systems of single tires of at least one tire group of a motor vehicle, which comprises the following steps:

emitting a trigger signal from an low frequency (LF) trigger to the wheel electronics systems of a relevant tire group with a variably adjustable first transmission field strength;

sending radio frequency (RF) signals from the wheel electronics systems at which a sufficiently high transmission field strength of the trigger signal has been received to a vehicle-side receiving unit, the RF signals containing an item of trigger information;

determining a number of RF signals received by the vehicle-side receiving unit, each containing one item of trigger information; and assigning the wheel electronics systems where a number of RF signals received by the vehicle-side receiving unit is equal to a number of wheel electronics systems of the single tires within the respective tire group.

In a preferred embodiment of the invention, at a transmission field strength of the LF trigger signal for which a number of RF signals received on the vehicle side is not equal to the number of wheel electronics systems of the single tires within the respective tire group, at least one further trigger event takes place at a different transmission field strength in such a manner that with a number that is greater/less than or equal to the number of wheel electronics systems of the single tires within the respective tire group an LF trigger signal with lower/higher transmission field strength is emitted until the number of RF signals received by the vehicle-side receiving unit equals the number of wheel electronics systems of the single tires within the respective group.

In a further preferred embodiment of the invention an error message is sent to the motor vehicle driver when the transmission field strength is reduced to the minimum field strength at which more than the number of wheel electronics systems within the respective tire group are determined.

In a further preferred embodiment of the invention an error message is sent to the motor vehicle driver when the transmission field strength is increased to the maximum field strength at which fewer than the number of wheel electronics systems are determined within the respective tire group.

In a further preferred embodiment of the invention the change in the transmission field strength is performed by means of an incremental change or a single adjustment.

In a further preferred embodiment of the invention the change in the transmission field strength is performed by means of an incremental change or a single adjustment.

Expediently the transmission field strength of the first triggering is equal to the transmission field strength of the last successful triggering.

A further advantageous embodiment of the invention consists in actuating the LF triggers in series or in parallel.

Expediently the system is provided with the number of wheel electronics systems of the single tires within the respective tire group.

Other features which are considered as characteristic for the invention are set forth in the appended claims.

Although the invention is illustrated and described herein as embodied in method for the targeted stimulation of wheel electronics systems of tire groups, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
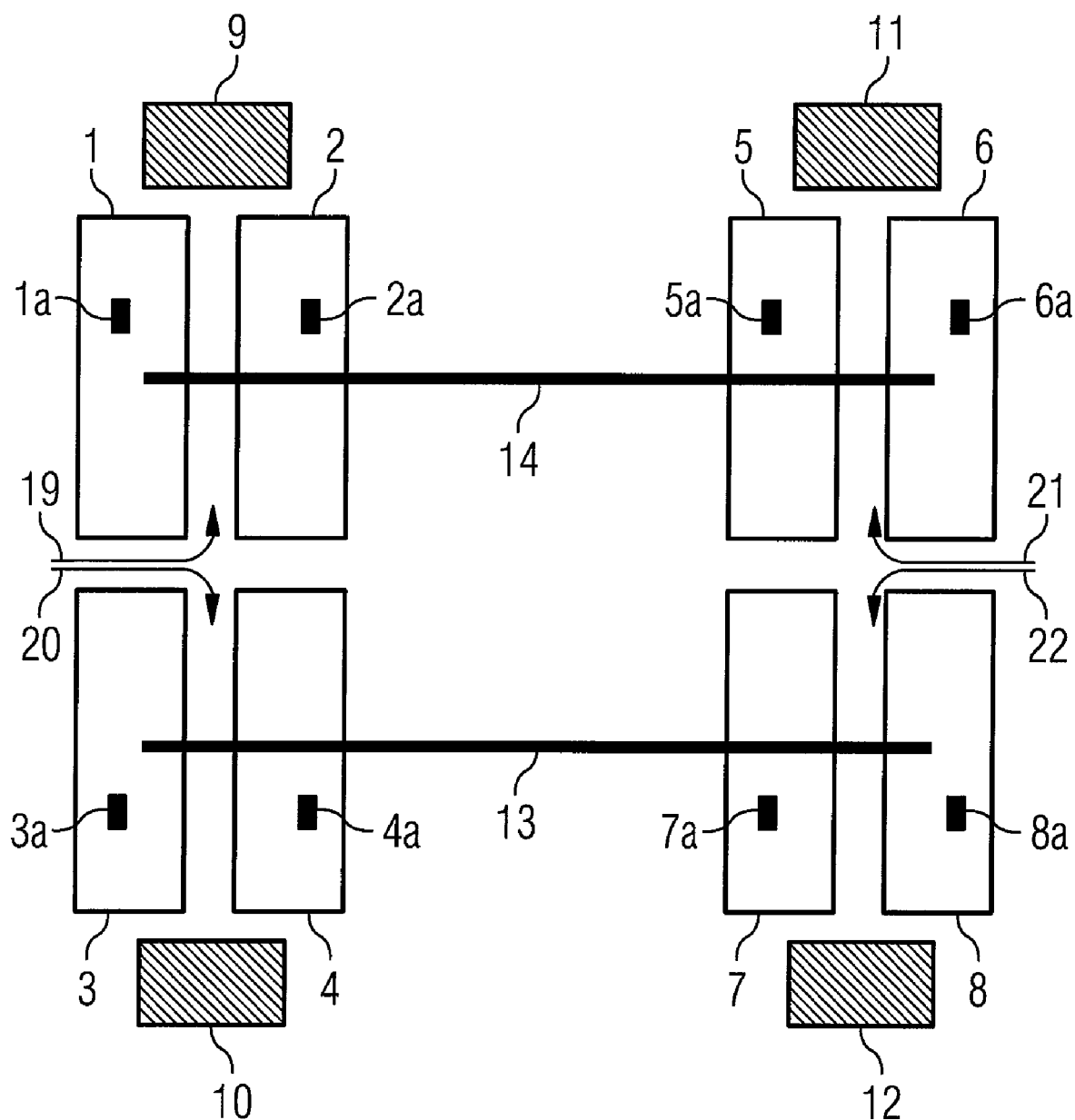
FIG. 1 is a schematic plan view showing four tire groups each having two wheel electronics systems and one LF trigger.

Referring now to the figures of the drawing in detail, wherein the same reference numerals are used for identical or functionally equivalent elements throughout, and first to FIG. 1 thereof, the schematic vehicle structure shows four tire groups 19, 20, 21, 22 to which are assigned the single tires 1, 2, 3, 4, 5, 6, 7, 8 with the corresponding wheel electronics systems 1a, 2a, 3a, 4a, 5a, 6a, 7a, 8a and each with an LF trigger 9, 10, 11, 12, respectively. The tire groups 19, 20, 21, 22 formed for example from dual tires are correspondingly arranged at each of the axles 13 and 14.

Figure 2A:
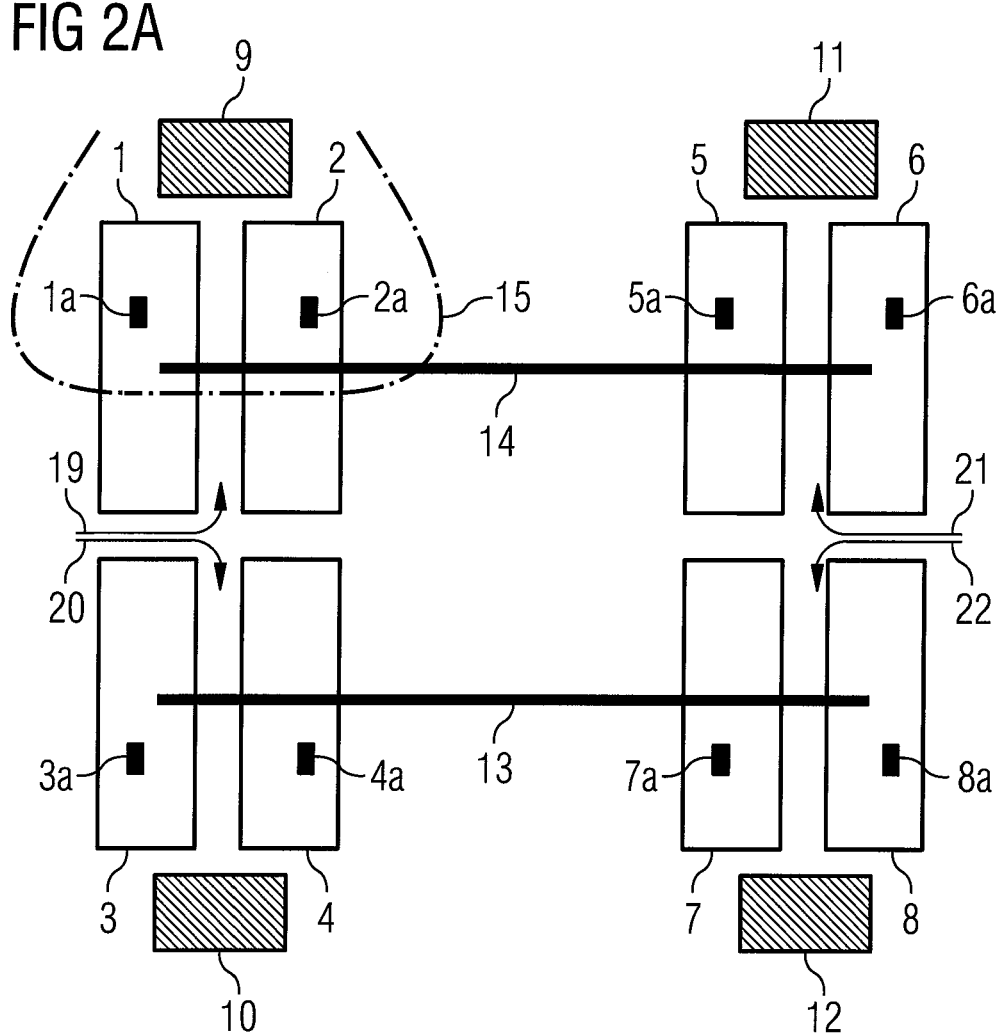
FIG. 2A is a similar view showing four tire groups, as in FIG. 1, and an optimal transmission field strength of the LF trigger.

FIG. 2A is similar to FIG. 1, with an additional exemplary optimal transmission field strength 15 triggered by the LF trigger 9.

Figure 2B:
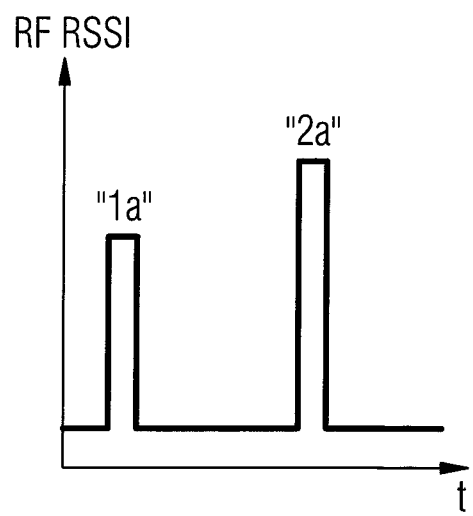
FIG. 2B is a diagram of received target radio frequency signals as a function of time.

FIG. 2B shows an exemplary diagram of received radio frequency signals RF RSSI as a function of the time t for the wheel electronics systems 1a, 2a. The transmission of the RF signals was accordingly triggered by a LF trigger signal at the wheel electronics system 1a and 2a. In this case the transmission field strength of the LF trigger signal was sized such that only RF signals were triggered at the wheel electronics systems 1a, 2a.

Figure 3A:
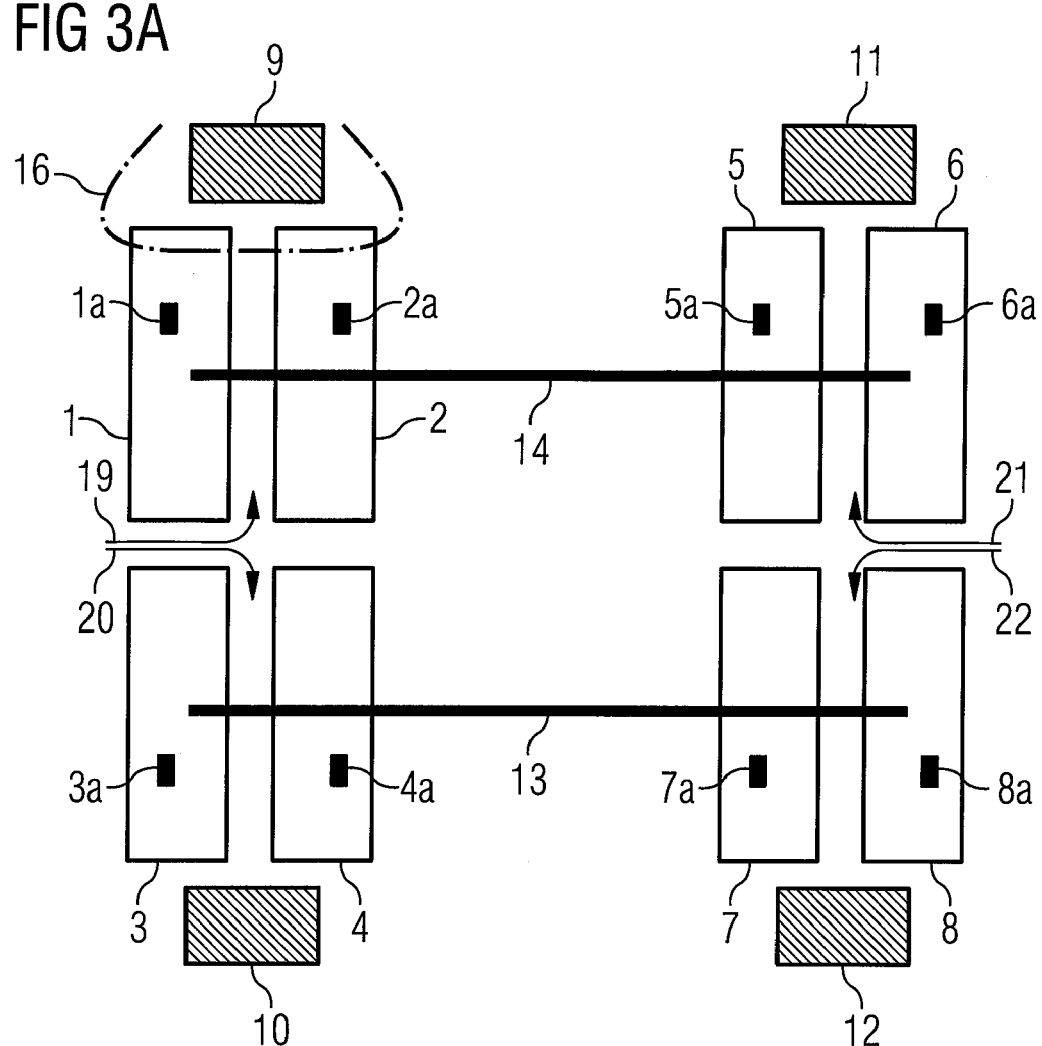
FIG. 3A is a schematic plan view of four tire groups, as in FIG. 1, and a transmission field strength of the LF trigger that is too low.

FIG. 3A is similar to FIG. 1, with an additional exemplary transmission field strength 16 that is too low, triggered by the LF trigger 9.

Figure 3B:
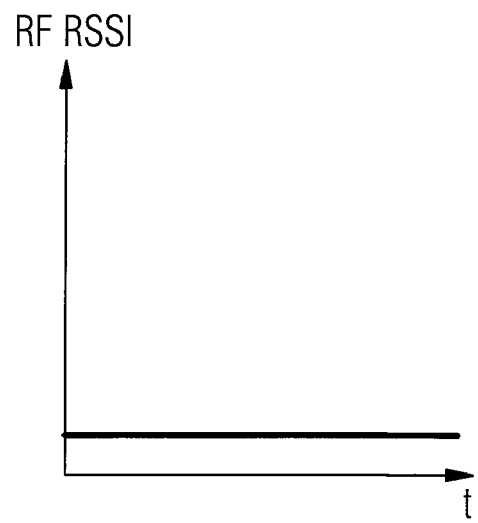
FIG. 3B is a diagram without received radio frequency signals as a function of time.

FIG. 3B shows an exemplary diagram without received radio frequency signals RF RSSI as a function of the time t. In contrast to the example from FIG. 2B the transmission field strength of the LF trigger signal was in this case too low to trigger an RF signal at the adjacent wheel electronics systems.

Figure 4A:
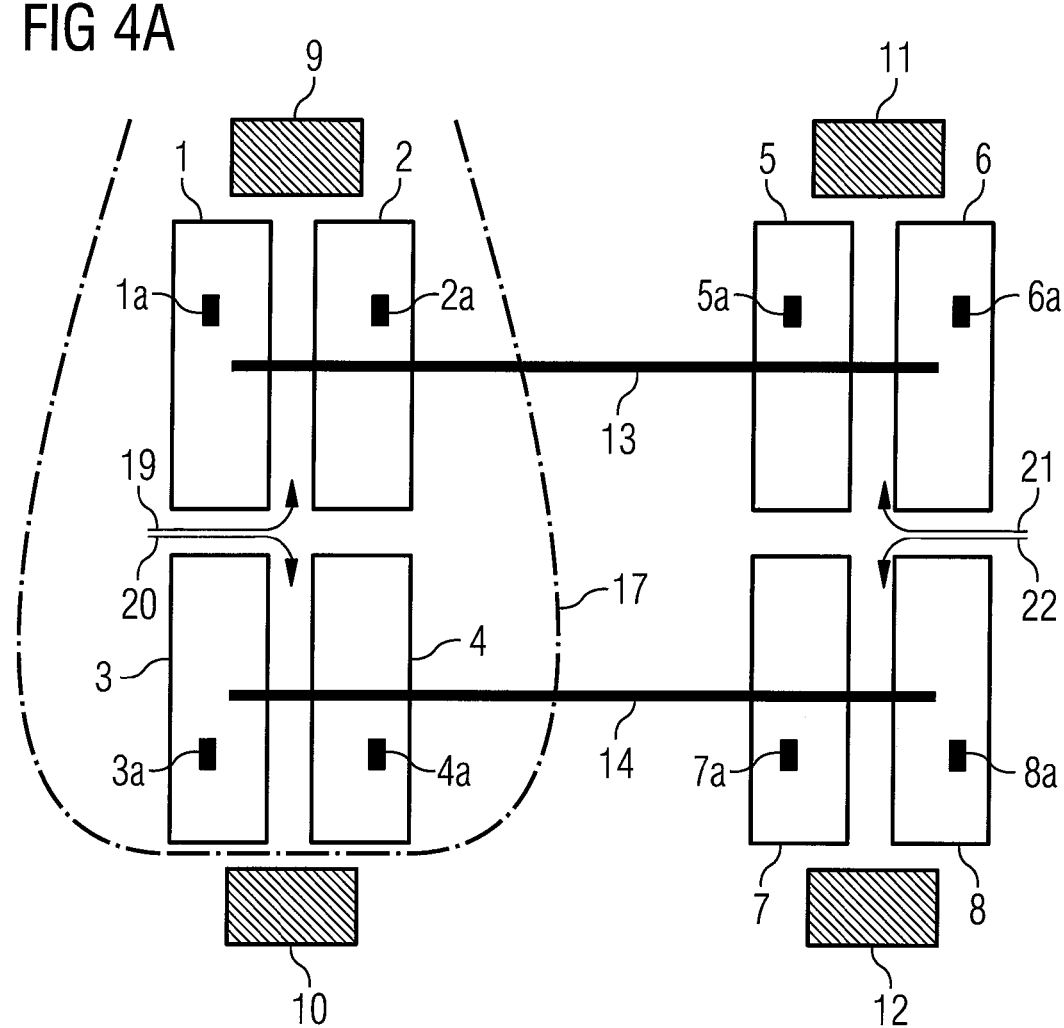
FIG. 4A is a schematic plan view of four tire groups, as in FIG. 1, and a transmission field strength of the LF trigger that is too high.

FIG. 4A is similar to FIG. 1, with an additional exemplary transmission field strength 17 that is too high, triggered by the LF trigger 9.

Figure 4B:
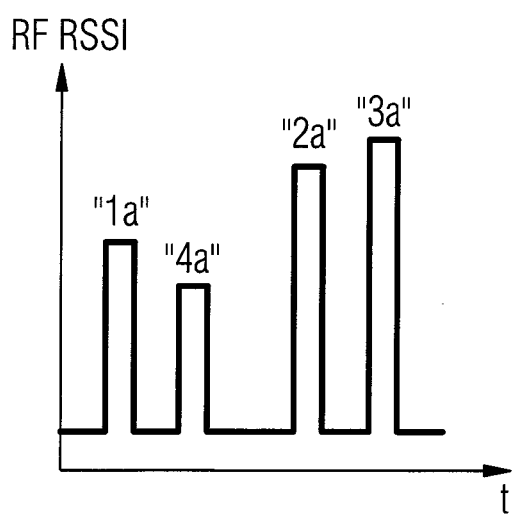
FIG. 4B is a diagram of received radio frequency signals as a function of time.

FIG. 4B shows an exemplary diagram of received radio frequency signals RF RSSI as a function of the time t. The transmission of the RF signals was accordingly triggered by a LF trigger signal at the wheel electronics system 1a and 2a. In this case the transmission field strength of the LF trigger signal was sized such that RF signals were triggered at the wheel electronics systems 1a, 2a and additionally at the wheel electronics systems 3a, 4a.

LF triggers 9, 10, 11, 12 can be used, in the method according to the invention, that have a transmission field strength that is either continuously variable or variable in several discrete steps. In this way an adjustment of the LF trigger power is possible during the operating time so that too low a power, which leads to the target wheel electronics systems 1a, 2a, 3a, 4a, 5a, 6a, 7a, 8a failing to react, can also be corrected in the same way as too high a trigger power, which leads to additional parasitically triggered wheels 1a, 2a, 3a, 4a, 5a, 6a, 7a, 8a responding.

A method can be executed for example such that initially the power known to be optimal from the last driving cycle is used for triggering, while a receiver "listens" for RF telegrams that respond with the status signal "triggered." The system expects that precisely the number of wheel electronics systems 1a, 2a, 3a, 4a, 5a, 6a, 7a, 8a of the single tires 1, 2, 3, 4, 5, 6, 7, 8 within the respective tire group 19, 20, 21, 22 will report themselves as having been triggered.

In the present example of a heavy truck according to FIG. 1 there are two wheel electronics systems 1a, 2a, 3a, 4a, 5a, 6a, 7a, 8a accordingly at one of each tire group 19, 20, 21, 22 formed by dual tires. If more than two wheel electronics systems 1a, 2a, 3a, 4a, 5a, 6a, 7a, 8a are found, the power is reduced and the trigger event is repeated. This process is repeated until only two wheel electronics systems 1a, 2a, 3a, 4a, 5a, 6a, 7a, 8a of a tire group respond and any parasitically triggered wheel electronics systems 1a, 2a, 3a, 4a, 5a, 6a, 7a, 8a are no longer reached owing to the reduced power. If fewer than two wheel electronics systems 1a, 2a, 3a, 4a, 5a, 6a, 7a, 8a respond within the respective tire group 19, 20, 21, 22, the power is increased until precisely two wheel electronics systems 1a, 2a, 3a, 4a, 5a, 6a, 7a, 8a respond.

The typical methods of adjustment are conceivable here such as e.g. an incremental change, a single adjustment and possibly the correction of an over-adjustment. If the wheel electronics system 1a, 2a, 3a, 4a, 5a, 6a, 7a, 8a additionally measures the received LF field strength and transmits this value back to the receiver, a proportional adjustment is also possible in order to achieve the optimum level more quickly and precisely. In addition once an optimal value has been achieved it is expediently stored so as to persist beyond the firing cycles and used as the initial value for another journey.

If two wheel electronics systems 1a, 2a, 3a, 4a, 5a, 6a, 7a, 8a associated with the corresponding tire group 19, 20, 21, 22 do not respond even at maximum power, an error code is set. This code can either immediately or after several confirmations or in combination with further conditions lead to a system error being signaled in order to warn the driver of a system malfunction. Likewise an error code is set if more than two wheel electronics systems 1a, 2a, 3a, 4a, 5a, 6a, 7a, 8a within the corresponding tire group 19, 20, 21, 22 respond as having been triggered even at minimum power.

Furthermore when using a plurality of LF triggers 9, 10, 11, 12 on heavy goods vehicles with for example a plurality of double tire pairs, a spurious signal of low strength can be sent by adjacent LF triggers 9, 10, 11, 12 that prevents crosstalk by the first signal to adjacent wheel positions or that impedes crosstalk by means of collision with the spurious signal. In addition the LF triggering must be based on the transmission of a data telegram e.g. a value assigned by a vehicle-side control unit, a random number, a serial number or an item of position information. The spurious signal then disrupts the transmission of the data telegram to parasitic wheel positions by means of interference, but owing to its low intensity it does not disrupt the intended triggering at the target wheels.

This is achieved as a result of the core parameter "LF trigger transmission field strength" being time-variable and being controlled by a logic circuit such that optimal performance is ensured for the lifetime of the tire pressure monitoring system.

The present invention is particularly suited to tire pressure monitoring systems for motor vehicles with dual tires.

The invention claimed is:

1. A method for stimulating wheel electronics systems of single tires of at least one tire group of a motor vehicle, which comprises the following steps:
    emitting a trigger signal from a low frequency (LF) trigger to the wheel electronics systems of a relevant tire group with a variably adjustable first transmission field strength;
    sending radio frequency (RF) signals from the wheel electronics systems at which a sufficiently high transmission field strength of the trigger signal has been received to a vehicle-side receiving unit, the RF signals containing an item of trigger information;
    determining a number of RF signals received by the vehicle-side receiving unit, each containing one item of trigger information; and
    assigning the wheel electronics systems to the single tires where a number of RF signals received by the vehicle-side receiving unit is equal to a number of wheel electronics systems of the single tires within a respective tire group.

2. The method according to claim 1, which comprises, if a number of RF signals received on a vehicle side is not equal to the number of wheel electronics systems of the single tires within the respective tire group, effecting at least one further trigger event at a different transmission field strength, wherein an LF trigger signal with lower or higher transmission field strength is emitted if the number is greater or less than the number of wheel electronics systems of the single tires within the respective tire group, until the number of RF signals received by the vehicle-side receiving unit equals the number of wheel electronics systems of the single tires within the respective tire group.

3. The method according to claim 2, which comprises changing the transmission field strength incrementally.

4. The method according to claim 2, which comprises changing the transmission field strength with a single adjustment.

5. The method according to claim 1, which comprises issuing an error message for a driver of the motor vehicle when the transmission field strength is reduced to a minimum field strength and more than the number of wheel electronics systems within the respective tire group are determined.

6. The method according to claim 1, which comprises issuing an error message for a driver of the motor vehicle when the transmission field strength is increased to a maximum field strength and fewer than the number of wheel electronics systems are determined within the respective tire group.

7. The method according to claim 1, which comprises setting the transmission field strength of a first triggering operation equal to the transmission field strength of a last successful triggering operation.

8. The method according to claim 1, which comprises actuating the LF triggers in series.

9. The method according to claim 1, which comprises actuating the LF triggers in parallel.

10. The method according to claim 1, wherein the number of wheel electronics systems of the single tires within the respective tire group is specified to the wheel electronics systems.

* * * * *